(12) United States Patent
Bender et al.

(10) Patent No.: US 9,460,438 B1
(45) Date of Patent: Oct. 4, 2016

(54) AUTHENTICATING A REQUEST FOR AN ELECTRONIC TRANSACTION (71) Applicant: International Business Machines Corporation, Armonk, NY (US)

(72) Inventors: Michael Bender, Rye Brook, NY (US); David E. Nachman, Morristown, NJ (US); Michael P. Shute, New Rochelle, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/663,739

(22) Filed: Mar. 20, 2015

(51) Int. Cl.
 G06K 5/00 (2006.01)
 G06Q 20/40 (2012.01)
 G06Q 50/00 (2012.01)

(52) U.S. Cl.
 CPC ........ G06Q 20/4016 (2013.01); G06Q 20/405 (2013.01); G06Q 50/01 (2013.01)

(58) Field of Classification Search
 CPC .......................... G06Q 20/12; G06Q 30/0601
 USPC .................... 235/380; 705/26.1, 44
 See application file for complete search history.

(56) References Cited

U.S. PATENT DOCUMENTS

| 8,302,164 | B2 | 10/2012 | Lunt |
| 8,635,117 | B1 | 1/2014 | Acuna-Rohter |
| 2008/0082349 | A1 | 4/2008 | Zackrison et al. |
| 2008/0281622 | A1 | 11/2008 | Hoal |
| 2012/0226579 | A1 | 9/2012 | Ha et al. |
| 2013/0036342 | A1 | 2/2013 | Deo et al. |
| 2013/0151617 | A1 | 6/2013 | Davis et al. |
| 2013/0191887 | A1 | 7/2013 | Davis et al. |
| 2013/0227016 | A1 | 8/2013 | Risher et al. |
| 2014/0129441 | A1* | 5/2014 | Blanco ................. G06Q 20/322 705/44 |
| 2014/0229376 | A1 | 8/2014 | Kaminsky et al. |
| 2014/0258136 | A1 | 9/2014 | Ellis |

FOREIGN PATENT DOCUMENTS

WO 2014145395 A2 9/2014

OTHER PUBLICATIONS

"Contextual Authentication: A Multi-factor Approach", PortalGuard, Published: Jun. 20, 2012,<http://www.slideshare.net/PortalGuard/context-based-authentication-13397991>.
Disclosed Anonymously, "%RBS% Method and Apparatus for User Authentication Based on Dynamic Question-Answer Generation from Social Networks Data", IP.com Prior Art Database Technical Disclosure, IP.com No. 000216026, IP.com Electronic Publication: Mar. 19, 2012.

(Continued)

Primary Examiner — Jamara Franklin
(74) Attorney, Agent, or Firm — Maeve Carpenter (57) ABSTRACT

In an approach for authenticating a request for an electronic transaction, a computer receives a request for an electronic transaction on a user account. The computer determines whether the request for the electronic transaction is suspicious, and responsive to determining the request is suspicious, the computer retrieves profile information for the user. The computer determines based on at least the profile information, one or more contacts of the user, wherein the one or more contacts are identified by the user. The computer then determines, based on at least a response from the one or more contacts, whether the request for the electronic transaction is suspicious, wherein determining the request is not suspicious validates authentication of the electronic transaction.

20 Claims, 3 Drawing Sheets

(56) References Cited

OTHER PUBLICATIONS

Fard et al., "Collaborative Mining in Multiple Social Networks Data for Criminal Group Discovery", 2009 International Conference on Computational Science and Engineering, IEEE Computer Society, Aug. 29-31, 2009.

Teh et al., "Context-aware Social Networking Mechanism for Achieving Lightweight P2P Authentication", IP.com Prior Art Database Technical Disclosure, IP.com No. 000157020, IP.com Electronic Publication: Aug. 9, 2007, Copyright: © Motorola Inc.

Weinstein et al., "Modeling and Detection Techniques for Counter-Terror Social Network Analysis and Intent Recognition", 2009 IEEE Aerospace Conference, IEEE Computer Society, Mar. 7-14, 2009 IEEE.

Yu et al., "Multistage Filtering for Collusion Detection in P2P Network", 2011 IEEE Ninth International Conference on Dependable, Autonomic and Secure Computing, IEEE Computer Society, Dec. 12-14, 2011.

* cited by examiner

AUTHENTICATING A REQUEST FOR AN ELECTRONIC TRANSACTION

TECHNICAL FIELD

The present invention relates generally to the field of electronic transaction processing, and more particularly to authenticating a request for an electronic transaction.

BACKGROUND

Electronic transactions continue to be the subject of scrutiny to reduce the risk of attempts to bypass security in place. One approach companies, such as banks and credit card companies, use to attempt to reduce the risk and to recognize "suspicious" activity in dealing with electronic transactions is behavioral analysis, where the behavior of the customer is analyzed based on various criteria, typically over a period of time. For example, if a customer usually performs transactions from the Chicago area, and an event is detected from the Dallas area, the transaction event may be classified as suspicious activity because it varies from the customer's previous behavior. Suspicious activity can result in denial of the transaction, or temporary deactivation of the customer account. While this may be appreciated in an actual fraudulent attempt to use the customer's account, if the customer is in fact traveling in Dallas, temporary deactivation or denial of the transaction is an inconvenience for the customer. Additional inconvenience may occur, for example, if the customer is traveling in a remote area and cannot be reached to validate the transaction.

SUMMARY

Aspects of the present invention provide an approach for authenticating a request for an electronic transaction, in accordance with an embodiment of the present invention. In one aspect, a method includes a computer receiving a request for an electronic transaction on a user account, and determining whether the request for the electronic transaction is suspicious. The computer, responsive to determining the request is suspicious, retrieves, profile information for the user, and determines, based on at least the profile information, one or more contacts of the user, wherein the one or more contacts are identified by the user. The computer then determines, based on at least a response from the one or more contacts, whether the request for the electronic transaction is suspicious, wherein determining the request is not suspicious validates authentication of the electronic transaction.

In another aspect, a computer program product includes one or more computer readable storage media and program instructions stored on the one or more computer readable storage media, the program instructions including program instructions to receive a request for an electronic transaction on a user account and to determine whether the request for the electronic transaction is suspicious. The computer program product includes program instructions, in response to determining the request is suspicious, to receive profile information for the user, and to determine, based on at least the profile information, one or more contacts of the user, wherein the one or more contacts are identified by the user. The computer program product includes program instructions to determine based on at least a response from the one or more contacts, whether the request for the electronic transaction is suspicious, wherein determining the request is not suspicious validates authentication of the electronic transaction.

In yet another aspect, a computer system includes one or more computer processors, one or more computer readable storage media, and program instructions stored on the one or more computer readable storage media for execution by at least one of the one or more computer processors. The computer system includes program instructions to receive a request for an electronic transaction on a user account and determine whether the request for the electronic transaction is suspicious. The computer system includes program instructions, in response to determining the request is suspicious, to receive profile information for the user, and to determine, based on at least the profile information, one or more contacts of the user, wherein the one or more contacts are identified by the user. The computer system includes program instructions to determine based on at least a response from the one or more contacts, whether the request for the electronic transaction is suspicious, wherein determining the request is not suspicious validates authentication of the electronic transaction.

In yet another aspect, a method deploying a networked computing environment includes providing a computer infrastructure being operable to authenticate a request for an electronic transaction. The method includes a computer receiving a request for an electronic transaction on a user account, and determining whether the request for the electronic transaction is suspicious. The computer, responsive to determining the request is suspicious, retrieves, profile information for the user, and determines, based on at least the profile information, one or more contacts of the user, wherein the one or more contacts are identified by the user. The computer then determines, based on at least a response from the one or more contacts, whether the request for the electronic transaction is suspicious, wherein determining the request is not suspicious validates authentication of the electronic transaction.

DETAILED DESCRIPTION

Many techniques exist to deter unauthorized authentication attempts, however, when an unauthorized user obtains a legitimate user's credentials and gains access, it is difficult for a system to know that someone attempting authorization is not in fact the legitimate user. Some evidence leading the system to question the one accessing can be gained based on the location from which the access attempt is received. An access attempt from a geographic location unusual for the legitimate user may trigger an investigative action into whether the legitimate user is attempting the access from the geographic location. Embodiments of the present invention recognize that the use of social media networks may aid in determining whether the legitimate user may be in the geographic location, such as through communication with the legitimate user's social media contacts.

Figure 1:
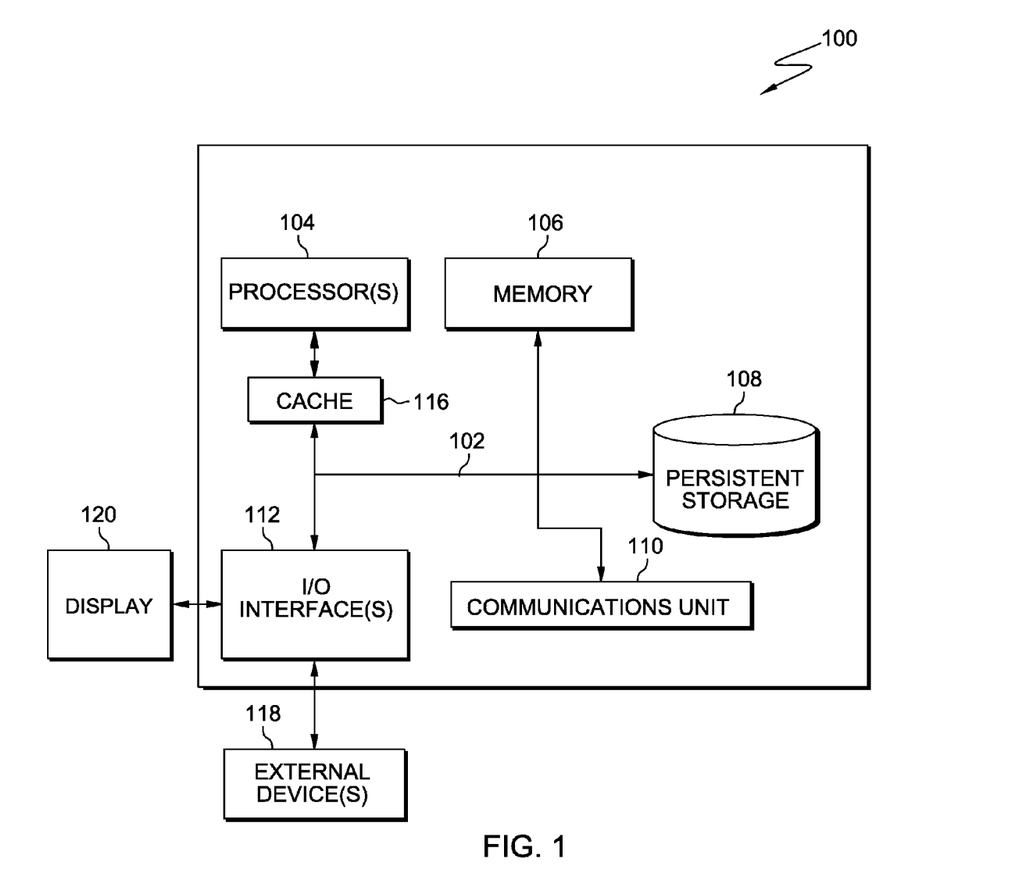
FIG. 1 is a block diagram of components of a data processing system, in accordance with an embodiment of the present invention.

The present invention will now be described in detail with reference to the Figures. FIG. 1 depicts a block diagram of components of a computer system 100, in accordance with an illustrative embodiment of the present invention. It should be appreciated that FIG. 1 provides only an illustration of one implementation and does not imply any limitations with regard to the environments in which different embodiments may be implemented. Many modifications to the depicted environment may be made.

Computer system 100 includes computer processor(s) 104, cache 116, memory 106, persistent storage 108, communications unit 110, input/output (I/O) interface(s) 112, and communications fabric 102. Communications fabric 102 provides communications between computer processor(s) 104, memory 106, persistent storage 108, communications unit 110, and I/O interface(s) 112. Communications fabric 102 can be implemented with any architecture designed for passing data and/or control information between processors (such as microprocessors, communications and network processors, etc.), system memory, peripheral devices, and any other hardware components within a system. For example, communications fabric 102 can be implemented with one or more buses.

Memory 106 and persistent storage 108 are computer readable storage media. In this embodiment, memory 106 includes random access memory (RAM). In general, memory 106 can include any suitable volatile or non-volatile computer readable storage media. Cache 116 is a memory that enhances the performance of computer processor(s) 104 by storing recently accessed data, and data near recently accessed data, from memory 106.

Program instructions and data used to practice embodiments of the present invention can be stored in persistent storage 108 for execution and/or access by one or more of the respective computer processor(s) 104 via one or more memories of memory 106. In this embodiment, persistent storage 108 includes a magnetic hard disk drive. Alternatively, or in addition to a magnetic hard disk drive, persistent storage 108 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 108 may also be removable. For example, a removable hard drive may be used for persistent storage 108. Other examples include optical and magnetic disks, thumb drives, and smart cards that are inserted into a drive for transfer onto another computer readable storage medium that is also part of persistent storage 108.

Communications unit 110, in these examples, provides for communications with other data processing systems or devices. In these examples, communications unit 110 includes one or more network interface cards. Communications unit 110 may provide communications through the use of either or both physical and wireless communications links. Program instructions and data used to practice embodiments of the present invention may be downloaded to persistent storage 108 through communications unit 110.

I/O interface(s) 112 allows for input and output of data with other devices that may be connected to computer system 100. For example, I/O interface(s) 112 may provide a connection to external device(s) 118 such as a keyboard, a keypad, a touch screen, and/or some other suitable input device. External device(s) 118 can also include portable computer readable storage media such as, for example, thumb drives, portable optical or magnetic disks, and memory cards. Software and data used to practice embodiments of the present invention can be stored on such portable computer readable storage media and can be loaded onto persistent storage 108 via I/O interface(s) 112. I/O interface(s) 112 also connect to a display 120. Display 120 provides a mechanism to display data to a user and may be, for example, a computer monitor or an incorporated display screen, such as is used, for example, in tablet computers and smart phones.

Figure 2:
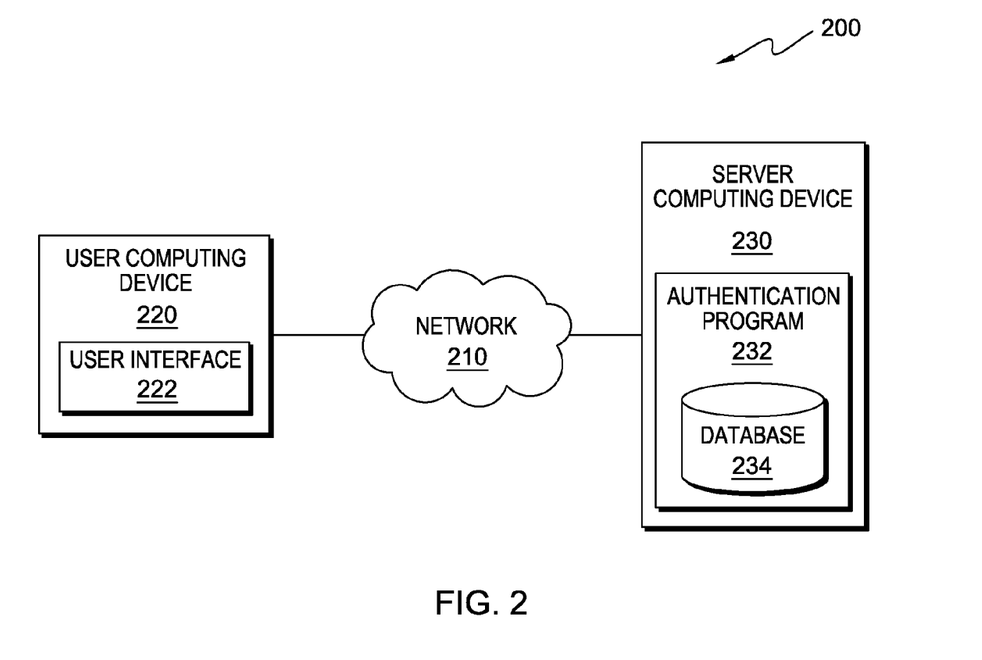
FIG. 2 is a functional block diagram illustrating a transaction processing environment, in accordance with an embodiment of the present invention.

FIG. 2 is a functional block diagram illustrating a transaction processing environment, generally designated 200, in accordance with one embodiment of the present invention. FIG. 2 provides only an illustration of one implementation and does not imply any limitations with regard to the environments in which different embodiments may be made by those skilled in the art without departing from the scope of the invention as recited by the claims.

Transaction processing environment 200 includes user computing device 220 and server computing device 230, interconnected via network 210. Network 210 can be, for example, a telecommunications network, a local area network (LAN), a wide area network (WAN), such as the Internet, or a combination of the three, and can include wired, wireless, or fiber optic connections. Network 210 may include one or more wired and/or wireless networks that are capable of receiving and transmitting data, voice, and/or video signals, including multimedia signals. In general, network 210 can be any combination of connections and protocols that will support communications between user computing device 220, server computing device 230, and other computing devices (not shown) within transaction processing environment 200.

In various embodiments, user computing device 220 can be a laptop computer, a tablet computer, a smartphone, or any programmable electronic device capable of communicating with server computing device 230 via network 210, and with various components and devices (not shown) within transaction processing environment 200. User computing device 220 may be a wearable computer. Wearable computers are electronic devices that may be worn by the bearer under, with, or on top of clothing, as well as in glasses, hats, wigs, or other accessories, and are capable of receiving, processing, storing, sending, and displaying data. In general, user computing device 220 represents any programmable electronic device capable of executing machine readable program instructions and communicating with other computing devices via a network, such as network 210. While depicted in FIG. 1 as a single computing device, in various embodiments, user computing device 220 may represent one, or a plurality of computing devices. User computing device 220 includes user interface (UI) 222.

UI 222 provides an interface between a user of user computing device 220 and server computing device 230. UI 222 may be a graphical user interface (GUI) or a web user interface (WUI) and can display text, documents, web browser windows, user options, application interfaces, and instructions for operation, and include the information (such as graphic, text and sound) that a program presents to a user and the control sequences the user employs to control the program. UI 222 may be mobile application software that provides an interface between a user of user computing device 220 and server computing device 230. Mobile application software, or an "app", is a computer program designed to run on smart phones, tablet computers, and other mobile devices. UI 222 enables a user of user computing device 220 to create a user profile and input information for operation of authentication program 232 on server computing device 230.

In various embodiments, server computing device 230 can be a standalone computing device, management server, a web server, a mobile computing device, or any other electronic device or computing system capable of receiving, sending, and processing data. In other embodiments, server computing device 230 can represent a server computing system utilizing multiple computers as a server system. In another embodiment, server computing device can be a laptop computer, a tablet computer, a netbook computer, a personal computer, a desktop computer, or any programmable electronic device capable of communicating with other computing devices (not shown) within transaction processing environment 200 via network 210. In another embodiment, server computing device 230 represents a computing system utilizing clustered computers and components (e.g., database server computers, application server computers, etc.) that act as a single pool of seamless resources when accessed within transaction processing environment 200. Server computing device 230 includes authentication program 232 and database 234. In various embodiments, each of the program and database included on server computing device 230 may be located elsewhere within transaction processing environment 200 with access to server computing device 230 via network 210. Server computing device 230 may include internal and external hardware components, as depicted and described with respect to computer system 100 in FIG. 1.

Authentication program 232 operates to determine whether a request for activity on an account associated with a user is suspicious based, at least in part, on confirming the user's current or expected location by communicating with a pre-determined list of social media contacts. Authentication program 232 identifies one or more contacts to request confirmation from, based, at least in part, on a user created profile identifying the one or more contacts, and then requests confirmation of the user's current location or actions. Based on a response to the requested confirmation, authentication program 232 either performs the requested activity or flags the request as suspicious.

Database 234 resides on server computing device 230. A database is an organized collection of data. Database 234 can be implemented with any type of storage device capable of storing data that can be accessed and utilized by server computing device 230, such as a database server, a hard disk drive, or a flash memory. In other embodiments, database 234 can represent multiple storage devices within transaction processing environment 200 or within server computing device 230. Database 234 stores information for use with authentication program 232, for example, user profile information, including user location and identification information, and a list of one or more contacts the user has identified for confirmation of user location information. In an embodiment, database 234 stores historical usage patterns for a user accessing one or more accounts associated with the user, for example, whether a user typically logs in to a bank account at home or in another location, usual spending patterns of the user, and other such historical usage information.

Figure 3:
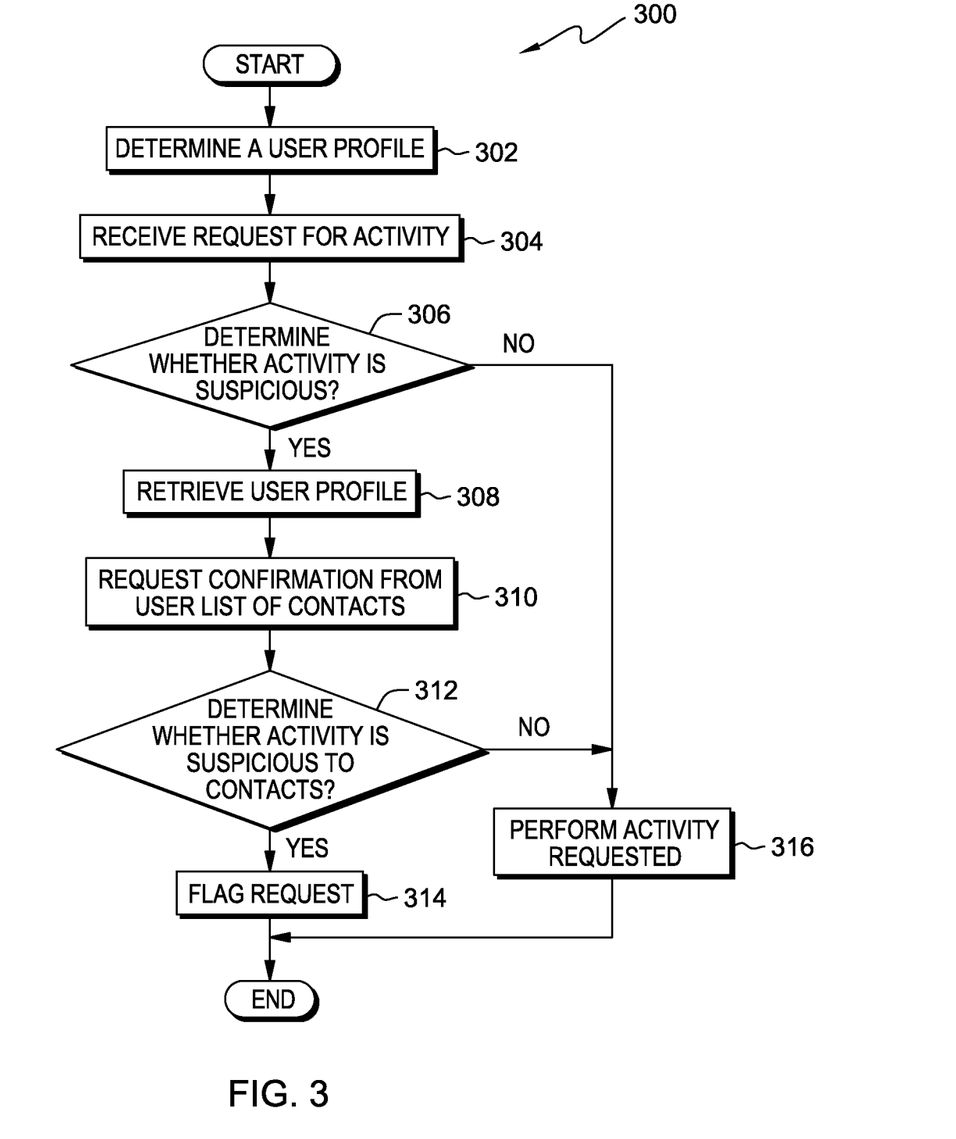
FIG. 3 is a flowchart depicting operational steps of an authentication program, in accordance with an embodiment of the present invention.

FIG. 3 is a flowchart 300 depicting operational steps of a program, which may represent the functionality of authentication program 232, in accordance with an embodiment of the present invention.

In one embodiment, authentication program 232 determines a user profile (302). At initialization or set up of authentication program 232, a user can create a user profile by inputting a plurality of user profile information, via a user interface, such as UI 222, to be used in authenticating a request for activity on the user's account. For example, the information can include user identification information, including a name or an address, and contact information for family members and friends, including, for example, a preferred method of contact, such as email or via a social media network. In one embodiment, the user profile includes a list of one or more social media contacts of the user that the user has identified based on various factors, including a frequency of contact between the user and the social media contact, or a closeness of relationship, where authentication program 232 can communicate with the identified contacts in order to verify a user's location. Social media contacts are social network users with which the user exchanges information, ideas, and other user generated content and communications via a network. The social media contacts identified by the user may be within a group such as friends or family, within a company-wide or location based group, or some other group of social network users determined by the user or by the social networking application. In some embodiments, a bank, a financial institution, or other transaction processing company can request the user profile information at set up of the user account.

In various other embodiments, a user profile can be set up which includes a plurality of authorization levels for identified contacts, and where an authorization level indicates a user preference, such that authentication program 232 communicates first with contacts associated with a higher authorization level than other contacts. In other embodiments, the authorization level may also indicate a weight to be given to a response, for example, a response from a contact with a high authorization level is to be given priority over a response from a contact with a lower authorization level, where higher and lower are determined relative to authorization levels of other contacts in the list of identified contacts. The authorization levels may be determined by a user, or the authorization levels may be based on factors such as a frequency of social network sharing between the user and a contact. A priority, or a high, authorization level may indicate the user and the contact are in frequent communication via a social network, where a lower, or no priority, authorization level may indicate the user and the contact rarely communicate via the social network, and the contact may not have knowledge of the user's location. In another embodiment, a user may assign a weight to each identified contact, where authentication program 232 uses the weight to determine a security level, for example, a high weight indicates the contact is cleared for high security applications, such as a banking transaction, and a low weight indicates the contact is not cleared for high security applications.

Authentication program 232 receives a request for activity (304). Authentication program 232, operating in conjunction with a transaction processing application, such as bank or other financial institution software, or operating as an add-on to the transaction processing application, receives a request for activity on the user account. Authentication program 232 may operate within log in or sign on functionality of an application. The request may be, for example, a withdrawal request, a purchase, or a log in attempt. In one embodiment, the activity requested is an electronic transaction associated with an account of the user.

Authentication program 232 determines whether the activity request is suspicious (decision block 306). Using known methods, such as behavioral analysis, authentication program 232 determines whether the activity request is suspicious. A suspicious activity request may be one that varies from, or falls outside of, a user's historical usage patterns for the account. For example, if a log in attempt occurs from Russia, and the user profile information indicates the user is located in Canada, the log in attempt is classified as suspicious. In another example, if a request is received for a $10,000 purchase using a user account, and a user's historical usage patterns indicate the user typically limits purchase transactions to less than $500, the activity request may be classified as suspicious. If the activity is determined to not be suspicious (decision block 306, "no" branch), then authentication program 232 performs the activity requested (316).

If the activity is determined to be suspicious (decision block 306, "yes" branch), then authentication program 232 retrieves the user profile (308). The user profile information for the user account in question can be stored in a database, such as database 234, for retrieval and use by authentication program 232. In one embodiment, authentication program 232 retrieves the list of social media contacts pre-determined and identified by the user, and stored in the user profile. In another embodiment, if the activity is determined to be suspicious, authentication program 232 contacts the user to request validation of the transaction prior to retrieving the user identified list of social media contacts.

Authentication program 232 requests a confirmation from the user identified list of contacts (310). In an embodiment, the user ranks the list of contacts. For example, a user may select a sibling for a priority level position on the list, with the expectation that the sibling is more likely to have knowledge of the user's location than a co-worker. The user's identified list of contacts may include one social media contact, or a plurality of contacts. In an embodiment, authentication program 232 determines which contact to communicate with based on the ranked list, e.g., a first ranked contact is selected first. In other embodiments, authentication program 232 selects a contact, for example, at random, in alphabetical order, or in chronological order, e.g., order added to the list by the user. In some embodiments, a user profile may include one or more instructions regarding how many contacts to communicate with, for example, one or a plurality, or which authorization level to communicate with based on the type of transaction. For example, a user may identify two priority, or high authorization level, contacts to be contacted for banking transactions, or a list of five contacts to be selected from those contacts viewing the user's social media profile more than one time per week.

Authentication program 232 transmits a request to the selected contact to confirm that the user is in the location from which the activity request was received. The request may be in the form of a question, for example, "is user A in location B today?" or the request may be a multiple choice question, asking the contact to select the country in which the user is currently located. In an embodiment, authentication program 232 can transmit a request to a contact verifying whether the user is planning a large purchase or a withdrawal not typical for the user account. The request may be transmitted via social media, for example, a message, or via email, text, or any of a number of communication methods. In some embodiments, the user includes a preferred communication method for each contact. In other embodiments, authentication program 232 communicates via a default method, for example, social media message.

In another embodiment, authentication program 232 determines a contact to communicate with based on a frequency with which the user interacts with the contact on social media. For example, authentication program 232 determines the user and a first contact message several times a day, as opposed to the user and a second contact, who communicate at most one time a week. Authentication program 232 can select the first contact and send a request for confirmation of the user's location to the first contact.

Authentication program 232 determines whether the activity request is suspicious to at least one of the contacts (decision block 312). Authentication program 232 determines whether the activity request, for example, an electronic transaction, is suspicious to any of the contacts based on a response to the requested confirmation. The response may be, for example, a 'yes' or 'no' to the request to confirm the user location. In an embodiment, a user may include a requirement for a specific number of responses when creating the user profile. For example, for a banking transaction, a user may require a minimum of three responses confirming the user's location or confirming the user's planned purchase activity. If the requested activity is not suspicious to at least one of the contacts (decision block 312, "no" branch), then authentication program 232 performs the activity requested (316). If authentication program 232 confirms the activity request is not suspicious, then authentication program 232 validates authentication of the electronic transaction, allowing performance of the activity.

If the requested activity is suspicious to at least one of the contacts (decision block 312, "yes" branch), then authentication program 232 flags the request for activity (314). Authentication program 132 confirms the request for activity is suspicious based on any response received from the identified list of contacts, and can flag the request as suspicious. In various embodiments, based on the user account, user profile information, and the transaction processing application, a flagged request can result in the request for activity being denied, the account can be deactivated, or the request can be flagged and the activity performed.

In another embodiment, the invention provides a method that performs the process of the invention on a subscription, advertising, and/or fee basis. That is, a service provider, such as a Solution Integrator, could offer to provide functionality for authenticating a request for an electronic transaction. In this case, the service provider can create, maintain, support, etc., a computer infrastructure, such as computer system 100 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for authenticating a request for an electronic transaction. In this case, a computer infrastructure, such as computer system 100 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 100 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processors, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for authenticating a request for an electronic transaction, the method comprising:

receiving, by one or more computer processors, a request for an electronic transaction on an account associated with a user;

determining, by one or more computer processors, whether the request for the electronic transaction is suspicious;

responsive to determining the request is suspicious, retrieving, by one or more computer processors, profile information for the user;

determining, by one or more computer processors, based on at least the profile information, one or more contacts of the user, wherein the one or more contacts are identified by the user; and determining, by one or more computer processors, based on at least a response from the one or more contacts, whether the request for the electronic transaction is suspicious, wherein determining the request is not suspicious validates authentication of the electronic transaction.

2. The method of claim 1, further comprising:
responsive to determining the request for the electronic transaction is not suspicious, performing, by one or more computers, the electronic transaction.

3. The method of claim 1, further comprising:
responsive to determining the request for the electronic transaction is suspicious, flagging, by one or more computer processors, the request as suspicious.

4. The method of claim 1, wherein determining whether the request for the electronic transaction is suspicious further comprises determining, by one or more computer processors, whether the request varies from one or more historical usage patterns of the user.

5. The method of claim 1, wherein the response from the one or more contacts includes a confirmation of a user location.

6. The method of claim 1, wherein the response from the one or more contacts is received, based on at least a request for confirmation of a user location.

7. The method of claim 1, wherein the one or more contacts include one or more social media contacts of the user identified by the user.

8. The method of claim 1, wherein the profile information includes an authorization level associated with each of the one or more contacts.

9. A computer program product for authenticating a request for an electronic transaction, the computer program product comprising:
one or more computer readable storage media and program instructions stored on the one or more computer readable storage media, the program instructions comprising:
program instructions to receive a request for an electronic transaction on an account associated with a user;
program instructions to determine whether the request for the electronic transaction is suspicious;
program instructions, in response to determining the request is suspicious, to receive profile information for the user;
program instructions to determine, based on at least the profile information, one or more contacts of the user, wherein the one or more contacts are identified by the user; and
program instructions to determine based on at least a response from the one or more contacts, whether the request for the electronic transaction is suspicious, wherein determining the request is not suspicious validates authentication of the electronic transaction.

10. The computer program product of claim 9, further comprising program instructions, in response to determining the request for the electronic transaction is suspicious, to flag the request as suspicious.

11. The computer program product of claim 9, wherein the program instructions to determine whether the request for the electronic transaction is suspicious further comprise program instructions to determine whether the request varies from one or more historical usage patterns of the user.

12. The computer program product of claim 9, wherein the response from the one or more contacts includes a confirmation of a user location.

13. The computer program product of claim 9, wherein the one or more contacts include one or more social media contacts of the user identified by the user.

14. The computer program product of claim 9, wherein the profile information includes an authorization level associated with each of the one or more contacts.

15. A computer system of authenticating a request for an electronic transaction, the computer system comprising:
one or more computer processors;
one or more computer readable storage media;
program instructions stored on the one or more computer readable storage media for execution by at least one of the one or more computer processors, the program instructions comprising:
program instructions to receive a request for an electronic transaction on an account associated with a user;
program instructions to determine whether the request for the electronic transaction is suspicious;
program instructions, in response to determining the request is suspicious, to receive profile information for the user;
program instructions to determine, based on at least the profile information, one or more contacts of the user, wherein the one or more contacts are identified by the user; and
program instructions to determine based on at least a response from the one or more contacts, whether the request for the electronic transaction is suspicious, wherein determining the request is not suspicious validates authentication of the electronic transaction.

16. The computer system of claim 15, further comprising program instructions, in response to determining the request for the electronic transaction is suspicious, to flag the request as suspicious.

17. The computer system of claim 15, wherein the program instructions to determine whether the request for the electronic transaction is suspicious further comprise program instructions to determine whether the request varies from one or more historical usage patterns of the user.

18. The computer system of claim 15, wherein the response from the one or more contacts includes a confirmation of a user location.

19. The computer system of claim 15, wherein the one or more contacts include one or more social media contacts of the user identified by the user.

20. The computer system of claim 15, wherein the profile information includes an authorization level associated with each of the one or more contacts.

* * * * *